United States Patent [19]

Tanaka et al.

[11] Patent Number: 5,304,059
[45] Date of Patent: Apr. 19, 1994

[54] BURNER DEVICE OF REGENERATIVE AND ALTERNATE COMBUSTION TYPE

[75] Inventors: Ryoichi Tanaka; Masao Kawamoto, both of Yokohama, Japan

[73] Assignee: Nippon Furnace Kogyo Kaisha, Ltd., Kanagawa, Japan

[21] Appl. No.: 79,071

[22] Filed: Jun. 15, 1993

Related U.S. Application Data

[63] Continuation of Ser. No. 33,859, May 6, 1993.

[51] Int. Cl.$^5$ ............................................. F23D 21/00
[52] U.S. Cl. .................................. 431/170; 126/91 A; 432/209
[58] Field of Search ...................... 431/170; 126/91 A; 432/209

[56] References Cited

U.S. PATENT DOCUMENTS 4,870,947 10/1989 Kawamoto ..................... 126/91 A
4,878,480 11/1989 Watson et al. ..................... 432/209

Primary Examiner—Carroll B. Dority
Attorney, Agent, or Firm—Notaro & Michalos

[57] ABSTRACT

A burner device of regenerative and alternate combustion type including a pair of burners and a regenerative bed, which permits flow passage changeover to be taken selectively between the pair of burners, via the regenerative bed, by four-way and three-way valves which are simultaneously operated by one actuator. Preferably, both two valves are connected coaxially together.

The four-way and three-way valves have a same angle of rotation for executing their respective flow passage changeover actions, but they each have its own inoperative area defined differently from each other to produce a difference in timing for supply of fluid to one of the two burners, thereby providing a lead time for prior supply of air and a delay time for delaying supply of fuel to facilitate ignition in one of the burners during the alternate combustion operation.

A rotary inner valve element in the three-way valve is increased in diameter relative to that of a communicator port formed therein to reduce the angle of rotation for closing its three ports in order to avoid an increased loss of pressure of fluid passing therethrough and make longer the foregoing delay time.

7 Claims, 7 Drawing Sheets

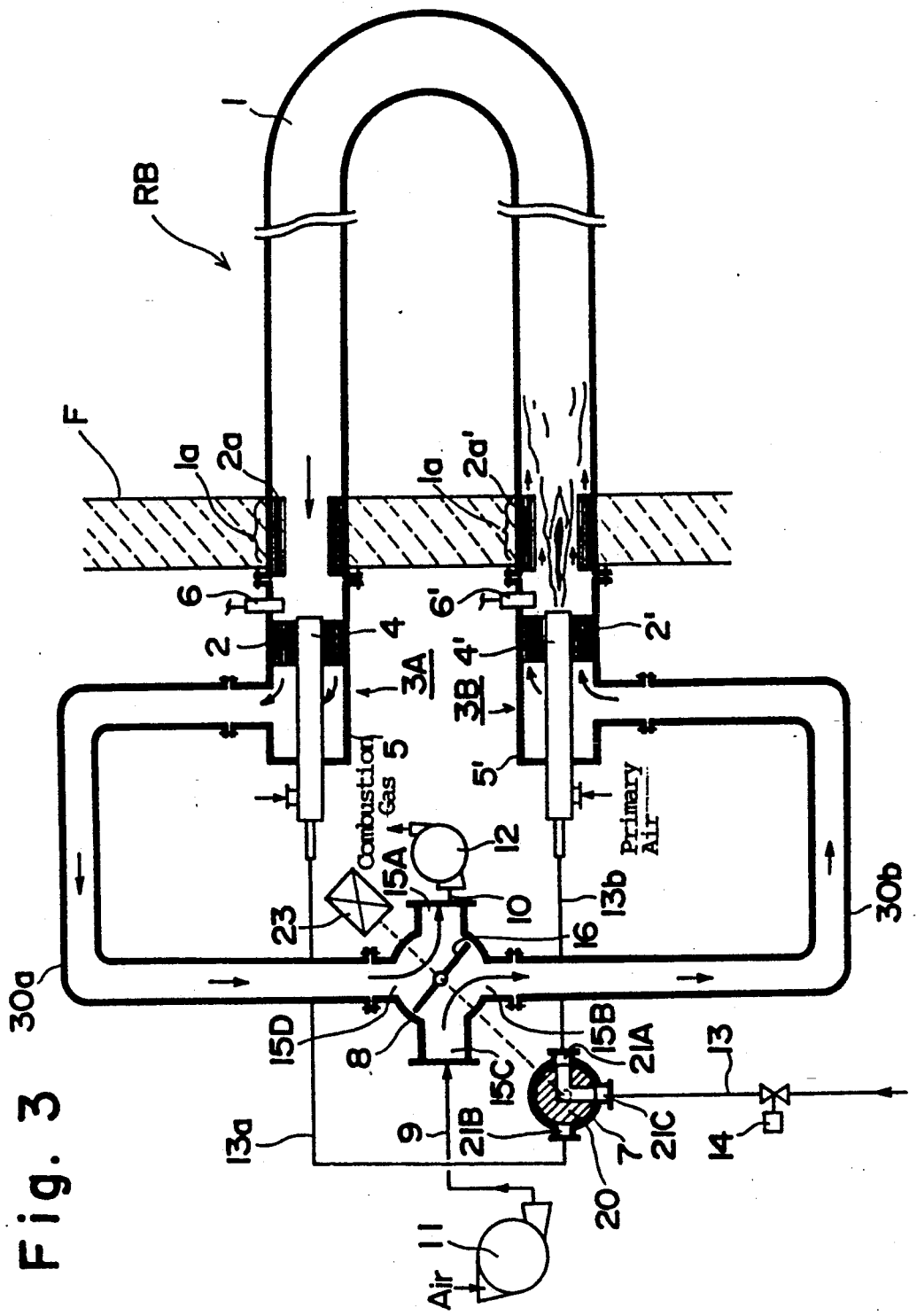

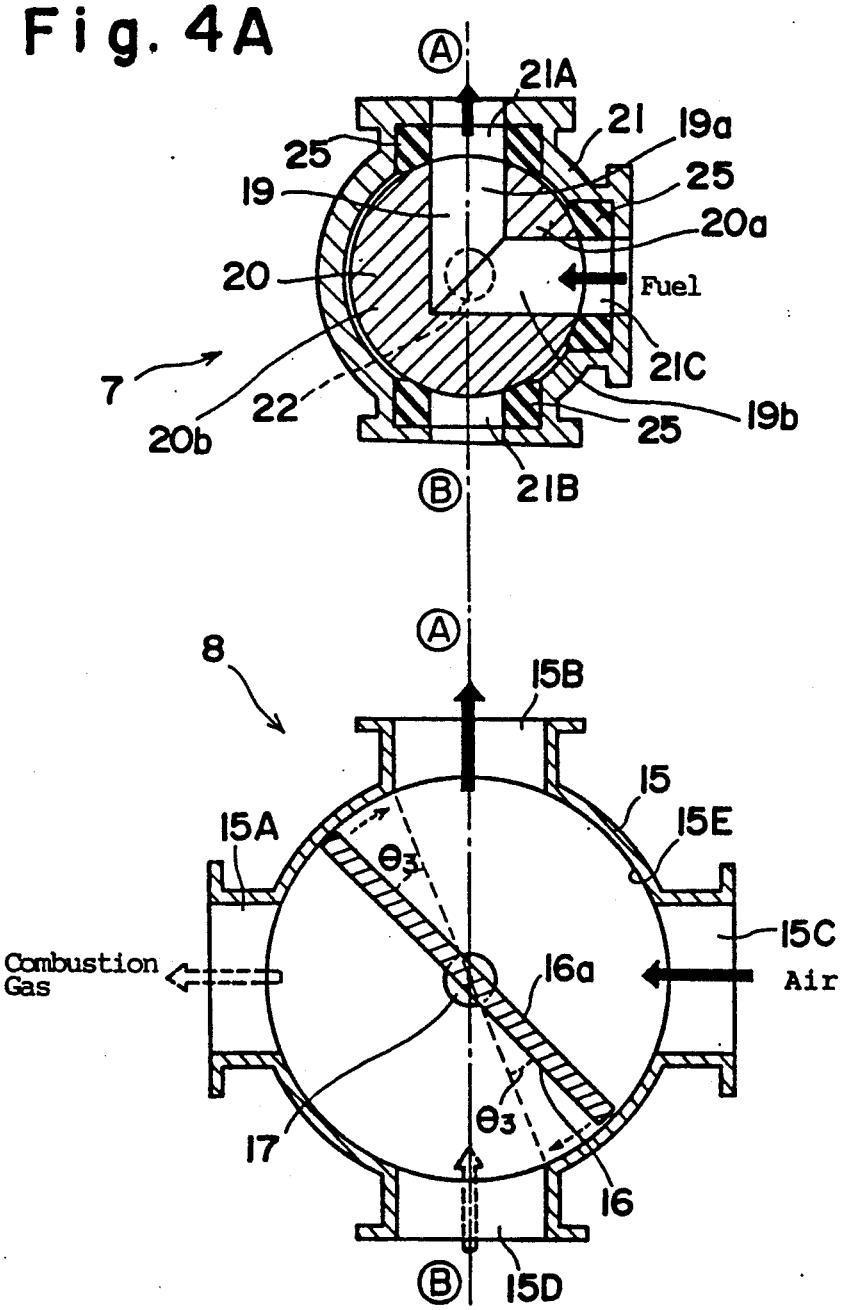

BURNER DEVICE OF REGENERATIVE AND ALTERNATE COMBUSTION TYPE

This application is a continuation of application Ser. No. 08/033,859, filed May 6, 1993, pending.

FIELD OF INVENTION

The present invention relates to a burner device of regenerative and alternate combustion having a pair of burners provided therein, and more particularly to an improvement of a flow passage change-over mechanism in this sort of burner device, which operates to selectively change the flow of a combustion air and a fuel into their respective air and fuel supply systems or lines in order to alternately supply the air to one of those paired burners and the fuel to another of them.

DESCRIPTION OF PRIOR ART

Among the alternate combustion type burner devices having a pair of burners, there has been known, for example, a regenerative heating radiant tube burner device, as illustrated in FIG. 1, which performs the alternate supply of combustion air and fuel between the two burners. Basically, this conventional burner device comprises a radiant tube 101, a pair of burners 103, 103' which are equipped at both ends of the radiant tube 101, respectively, and two regenerative beds 102, 102' each being situated inside of the respective burners 103, 103'. Operation of the burner device, as typically seen in FIG. 2, involves performing a combustion at either of the burners 103 and 103' alternately, and then, for example as shown, exhausting a generated combustion gas through the regenerative bed 102' in the non-operated burner 103', so that, subsequently, when the burner 103' is operative for combustion, a combustion air supplied thereto will be preheated by a heat reserved in the regenerative bed 102'. (See "Industrial Heating" Vol. 23, No. 6, P71 published by the Japan Industrial Furnace Association, and the U.S. Pat. No. 4,856,492).

Hitherto, in this sort of burner device, it has been a common practice to use electro-magnetic valves in order to selectively change the flow of combustion gas and air into either of the two burners. As can be seen from FIG. 1, the burner device is provided with four electro-magnetic valves; namely, two electro-magnetic valves 105, 106 disposed in the combustion air supply system and two same valves 104, 107 disposed in the combustion gas supply system. Those valves are selectively opened and closed to communicate one burner 103 with the combustion air supply system, while communicating another burner 103' with the communication gas exhaust system, thereby constituting an ordinary conventional flow change-over mechanism. Further, two additional electro-magnetic valves 108, 109 are used in a fuel supply system 110. Instead of such plural electro-magnetic valves, it has been proposed, as shown in FIG. 2, to employ a rotary four-way valve 207. The valve 207 comprises a casing 204 having four ports 201, 202, 203, 204 opened in four angles, and a rotary change-over valve element 206 provided rotatably within the casing 204. The change-over valve element 206 is controlled for rotation in the casing 204 so as to selectively place two adjoining ports, out of the four ports 201, 202, 203, 204, in a flow communication with each other, to thereby connect the combustion air supply system and combustion gas exhaust system with the two burners 103, 103', respectively, in a selective way. But, even in this case, two electro-magnetic valves 108, 109 are necessarily provided in the fuel supply system in order to control change-over of fuel flow into the operated one of the burners 103, 103' (e.g. the burner 103 as in FIG. 2).

However, the electro-magnetic valves cost highly, and particularly, the ones used in the high-temperature conditions, like in the furnace where the burner devices are installed, are very expensive, which results in an exceptional increase of costs for assembling a combustion or furnace facilities. Moreover, the electro-magnetic valve used in the air tubing is extremely large in size, and thus, when it comes to provision of six same large valves in the burner device, as shown in FIG. 1, a problem arises in that they take much of space in the burner device. This will be worse in the case where about tens and hundreds of such radiant tube burner devices shown are installed about a furnace. That is, a large space is taken around the furnace and tubings become more complicated, which causes a difficulty in terms of maintenances and assemblage of the burner devices.

Still further, if a great number of electro-magnetic valves of this kind are installed in a regenerative heating radiant tube burner device requiring frequent changes of flow passages at a very short time, e.g. 20 sec.–1 min., there will be a great possibility of a failure or malfunction of the devices, and in general, the life of those valves is only warranted for approx. 1,000,000. operations, requiring replacement by new ones in seven months or two years. This also raises costs for assembling a combustion or furnace facilities.

The use of four-way valve also requires provision of at least two electro-magnetic valves 108, 109 in the fuel supply system, as in FIG. 2, which will unexpectedly increase its number if used in a whole plant or facilities. The same problems as stated above, a high costs, great space, failure and malfunction, etc., remains outstanding.

The best operation of burner device entails setting an appropriate delay time for delaying the injection of fuel slightly behind a timing of supplying a combustion air with respect to operated burner 103 or 103', to facilitate ignition therein (namely, a lead time for supplying a combustion air into the burner should be set, slightly in advance of injecting the fuel thereinto). In view of this factor, it is also necessary to arrange a special control device for giving such delay time in order that the fuel will be supplied to the operated burner at a certain time after the flow of the combustion air has been changed towards the same burner.

SUMMARY OF THE INVENTION

In view of the above-stated drawbacks, it is therefore a first purpose of the present invention to provide an improved burner device of regenerative and alternate combustion type which is simplified in structure and enables the opening and closing of the fluid changeover valves without use of a special controller therefore and expensive electro-magnetic valves required for the high temperature gas.

In order to achieve such purpose, in accordance with the present invention, there is provided a burner device of regenerative and alternate combustion type including a pair of burners and a regenerative bed, wherein a combustion air is supplied through the regenerative bed to the burners and a combustion gas generated therefrom is exhausted through the regenerative bed, and wherein both the combustion air and a fuel are alternately supplied to either of the pair of burners, so that combustion is performed in one of the burners, while not being performed in another of the burners, the regenerative heating burner device comprising a combustion air supply system which is connected via the regenerative bed to the pair of burners and further connected to a combustion air supply source, a fuel supply system which is connected to the pair of burners and further to a fuel supply source, an exhaust system for exhausting the combustion gas generated from the one of the pair of burners, a four-way valve means which are connected to the combustion air supply system and the exhaust system and further to those pair of burners via the regenerative bed, the four-way valve means being so arranged as to selectively change over a flow passage of the combustion air sent from the combustion air supply source to one of the pair of burners, while simultaneously feeding the combustion gas to the exhaust system, a three-way valve means provided in the fuel supply system, the three-way valve means being so arranged as to selectively change over a flow passage of the fuel sent from the fuel supply source to one of the burners, thereby supplying the fuel thereinto, one drive means for causing an interlocking operation of both four-way valve means and three-way valve means, wherein operation of the drive means causes the two valve means to be actuated simultaneously, so as to effect their respective selective flow passage changeover actions at the same time, whereby both combustion air and fuel may be alternately supplied to either one of burners or another of burners.

Accordingly, the four-way and three-way valve means are operated simultaneously by such one drive means to effect their respective flow passage changeover actions, which realizes an interlocking operation of both valve means to reduce the number of electromagnetic valve means as low as possible and avoid use of special controller.

It is a second purpose of the present invention to permit setting of a certain lead time for prior supply of a combustion air and gas to one of the pair of burners and thus a delay time for delaying the supply of a fuel thereto subsequent to such supply of combustion air and gas, without use of a special means such as a controller.

To this end, the four-way and three-way valve means have a same angle of rotation for completing their respective selective flow passage changeover actions, and are operated in unison by the drive means, wherein the four-way valve means is provided with an initial inoperative area and a final inoperative area, whereas the three-way valve means is provided with one inoperative area, with such an arrangement that, during the operation, said four-way valve means is not involved for the flow passage changeover action of the combustion air and gas at an initial stage and a final stage, respectively, in the initial and final inoperative areas, and completes the changeover action between those two inoperative areas, whereas said three-way valve means is temporarily closed, during the operation, in the inoperative area thereof, and reopened for completing the selective fuel flow passage changeover action, and that the initial and final inoperative areas of said four-way valve means are defined respectively close to an initial point of the three-way valve means where it starts to be closed and a final point of the same where it starts to be reopened after leaving from the inoperative area, so that when the three-way valve means is being placed in the inoperative area thereof, the four-way valve means begins to change over both flow passages of the combustion air and gas, thereby providing a lead time for prior supply of the combustion air to a selected one of the burner and thus a delay time for delaying supply of the fuel thereto.

Hence, such prior change-over actions of four-way valve means starts the distribution of combustion air and gas from one of the burners to another thereof while the three-way valve means is being placed in the inoperative area, thereby giving a priority to the supply of air to one of the two burners, followed by the supply of fuel, for facilitating the ignition therein in the alternate combustion operations between the burners. Preferably, the four-way and three-way valve means are connected coaxially together by said drive means. That is, it may be preferable to penetrate a shaft or the like through the two valve means and connect the shaft with an output shaft of a suitable actuator.

In one aspect of the invention, the three-way valve means includes a rotary inner valve element provided rotatable therein, three connecting ports connected to the fuel supply system, and a communicator port penetrated through the rotary inner valve element, the communicator port being displaceable with rotation of the rotary inner valve element to cause the selective changeover of the fuel passage, an arrangement of the three-way valve means being such that a diameter of the rotary inner valve element is increased, while retaining a required cross-sectional flow passage area of the communicator port, to thereby permit reducing an angle of rotation of the rotary inner valve element for closing the fuel flow passage being opened by the communicator port for communication with one of the burners.

Accordingly, this makes it practical to keep longer the closed state of the three-way valve means, while avoiding a loss of pressure of fuel passing through the communicator port, thus allowing the foregoing delay time to be set longer.

In another aspect of the invention, the four-way valve means comprises a valve body, a first port, a second port, a third port and a fourth port disposed peripherally of the valve body at a 90-degree interval, and a rotary inner valve element of a plate form, the rotary inner valve element being rotatable provided within the valve body in a state being inclined at about 45 degrees, generally bisecting the 90-degree interval of the four ports, wherein the first port is connected with the combustion air supply source, the second port is connected with the exhaust system, the third port is connected with one of the pair of burners, the fourth port is connected with with another of the pair of burners, wherein operation of the drive means causes rotation of the plate-like rotary inner valve element to selectively change over the combustion air flow passage to one of the pair of burners in relation to the first port, so that the combustion air may be supplied from the first port to the selected one of the pair of burners through one of the third and fourth ports, while simultaneously the combustion gas may be exhausted from another of the pair of burners through the second port, wherein the three-way valve means comprises a valve body, a first port, second port and third port disposed peripherally thereof, and a rotary inner valve element rotatably provided in the valve body, such that the first port is connected with the fuel supply source, the second port is connected with one of the pair of burner, and the third port is connected with another of the pair of burner, wherein the rotary inner valve element has a communicator port penetrated therein, the communicator port being normally disposed to place the first port in a flow communication with one of the second and third ports, and wherein the inner rotary inner valve elements respectively of the four-way and three-way valve means has a same angle of rotation for completing their respective flow passage change-over actions, whereby, in operation, the drive means causes simultaneous rotation of the rotary inner valve elements of both four-way and three-way valve means, which results in the four-way valve means starting and completing the changeover of combustion air and gas flow passage to the selected one of the pair of burner via one of the third and four ports, earlier than the fuel flow passage change-over by the three-way valve means, thereby providing a lead time for the prior supply of the combustion air to the selected one of the burners and thus a delay time for delaying supply the fuel thereto.

Preferably, said three-way valve means is formed in a generally L-shaped configuration. The delay time may be determined by a distance between two communicator ports of said rotary inner valve element of said three-way valve means.

BRIEF DESCRIPTION OF THE DRAWINGS

FIG. 3 is a schematic diagram showing one embodiment of regenerative heating type radiant tube burner device to which the present invention is applied;

FIG. 4A is a schematic sectional view of a three-way valve and a four-way valve used in the burner device according to the present invention, which explanatorily shows the relative opening/closing state of both two valves for supplying a fuel and an air to a burner 3A;

DETAILED DESCRIPTION OF PREFERRED EMBODMENTS OF THE INVENTION

Figure 1:
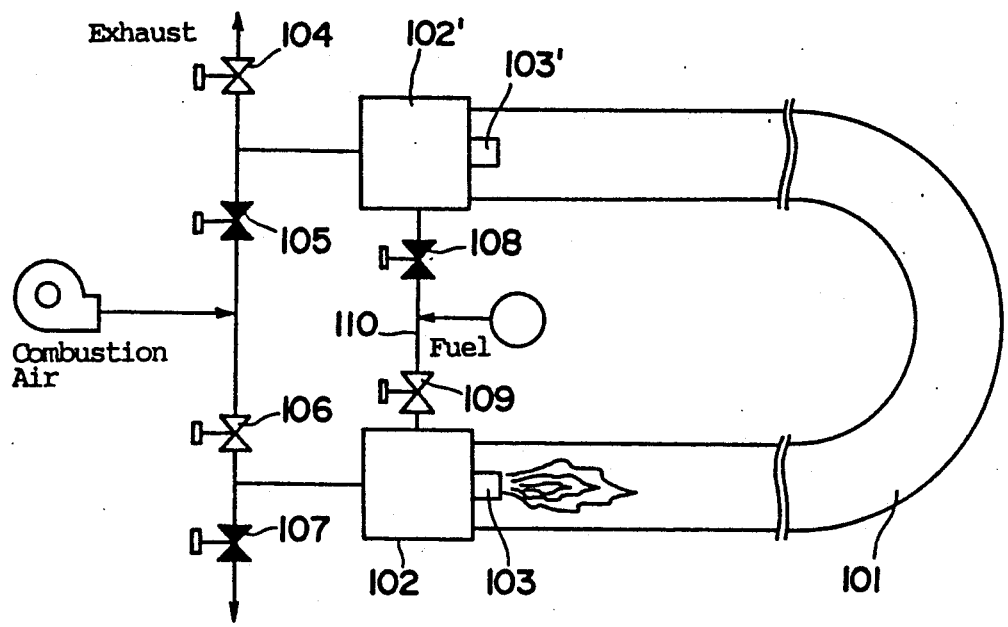
FIG. 1 is a schematic diagram showing one embodiment of conventional regenerative heating type radiant tube burner device.
Figure 2:
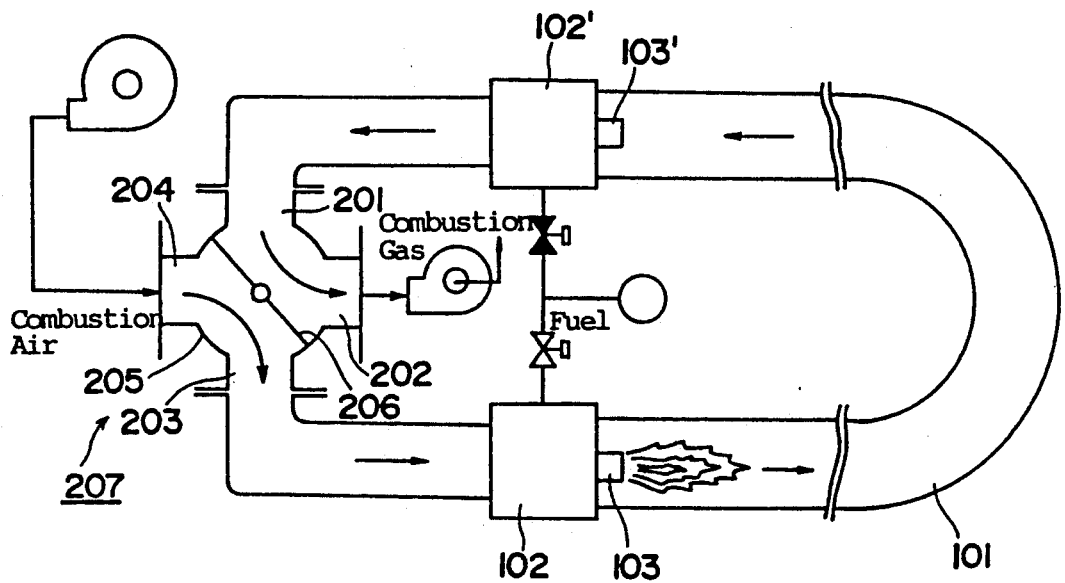
FIG. 2 is a schematic diagram showing another embodiment of conventional regenerative heating type radiant tube burner device.

Description will be made specifically of prefered embodiment of the present invention, with reference to the drawings.

It is to be noted that one typical embodiment of alternate combustion type burner device, which is adopted according to the invention, is based on such a regenerative heating type radiant tube burner device as designated by RB in FIG. 3, provided with a pair of burners. Briefly stated, the radiant tube burner device RB is shown as being installed in a furnace wall F, consisting essentially of a radiant tube 1 projected inside of the furnace wall F, a pair of burners 3A, 3B disposed respectively at both ends of the radiant tube 1, projecting outside the wall F, burner shells 5, 5' each being formed at the burners 3A, 3B respectively, regenerative beds 2, 2' each being provided within the two respective burner shells 5, 5', pilot burners 6, 6' each being provided at the same two respective burner shells 5, 5', a four-way valve 8 workable for selective flow communication of the burners 3A, 3B with either of a combustion air supply system 9 and a combustion gas exhaust system 10, and a three-way valve 7 workable for selective flow communication of a fuel supply system 13 with either of the burners 3A, 3B.

The combustion or heating way of the foregoing burner device RB is basically carried out in the same way as explained in the aforementioned prior-art burner devices. By way of example, as indicated in FIG. 3, the process of combustion involves effecting an ignition in the burner 3B by a burner gun 6', using a primary air and fuel, which generates a combustion gas from the burner 3B. The combination gas is introduced in the radiant tube 1 into the non-operated burner 3A and passes through its regenerative bed 2 for exhaust from the burner device RB. Thereafter, the combustion operation is altered from the burner 3B to the one 3A, effecting an ignition likewise in the latter burner 3A. At this stage, the ignition is facilitated due to the preheating of the combustion air by the regenerative bed 2. It will be seen that the burners 3A and 3B are each alternately brought in combustion operation, with their respective regenerative beds 2, 2' performing such preheating.

The regenerative beds 2, 2' are adapted to recover and reserve a heat of combustion gas being supplied from the radiant tube 1. Normally and preferably, they should be formed from a honey-comb ceramics or the like which is not reactive with the combustion gas and will not adversely affect the combustion air. The beds 2, 2' may be installed at the upstream side distant from the nozzles of burner guns 4, 4', such that, for example, as shown in FIG. 3, the beds 2, 2' are disposed within the burner shells 5, 5' such as to embrace the respective burners 4, 4'. But, depending on a design of burner device RB, the regenerative beds 2, 2' may be disposed outside the burner shells 5, 5'. Designations 2a, 2a' denote auxiliary regenerative beds, each being fitted in the respective bang portions 1a, 1a' of radiant tube 1. The auxiliary regenerative beds 2a, 2a' also acts as an insulation protective cylinder against the furnace wall F.

As shown in FIG. 3, according to the present invention, the four-way valve 8 and three-way valve 7 are arranged uniquely in the above-described alternate combustion type burner device RB. In brief and as will be more apparent later, the four-way valve 8 is connected with the combustion air supply system 9 and combustion gas exhaust system 10 as well as with one duct 30a and another duct 30b extending respectively from the burners 3A and 3B. On the other hand, the three-way valve 7 is connected with the fuel supply system 13 as well as with a fuel supply passage 13a associated with the burner gun 4 at the burner 3A and another fuel supply passage 13b associated with the burner gun 4' at the burner 3B. Both four-way and three-way valves 8, 7 are interlocked and operated in unison, providing an important means for effecting the alternate combustion operation, as will be described specifically below.

As illustrated, via the four-way valve 8, the burner shells 5, 5' of the burners 3A, 3B are connected with combustion air supply system 9 and combustion gas exhaust system 10. By operation of such valve 8, a combustion air, which is supplied from a forced draft fan 11 in the air supply system 9, is introduced into one of the two burners 3A, 3B, for combustion therein, while at the same time, a combustion gas being generated is induced towards another of the burners 3A, 3B by means of an exhaust blower 12, so that the gas passes through one of the two regenerative beds 2, 2' for exhaust out of the burner device RB. In other words, the four-way valve 8 is operable to alternately change over the respective flows of combustion air and gas between the two burners 3A and 3B. This flow change-over operation may be effected periodically at a predetermined interval of time by use of a suitable timer (not shown), or may be done each time a thermo-sensitive detector (not shown) detects that a temperature of combustion gas passing through the regenerative bed 2 or 2' reaches a given degree. Of course, those controls may be made by a suitable computerized system.

Figure 4B:
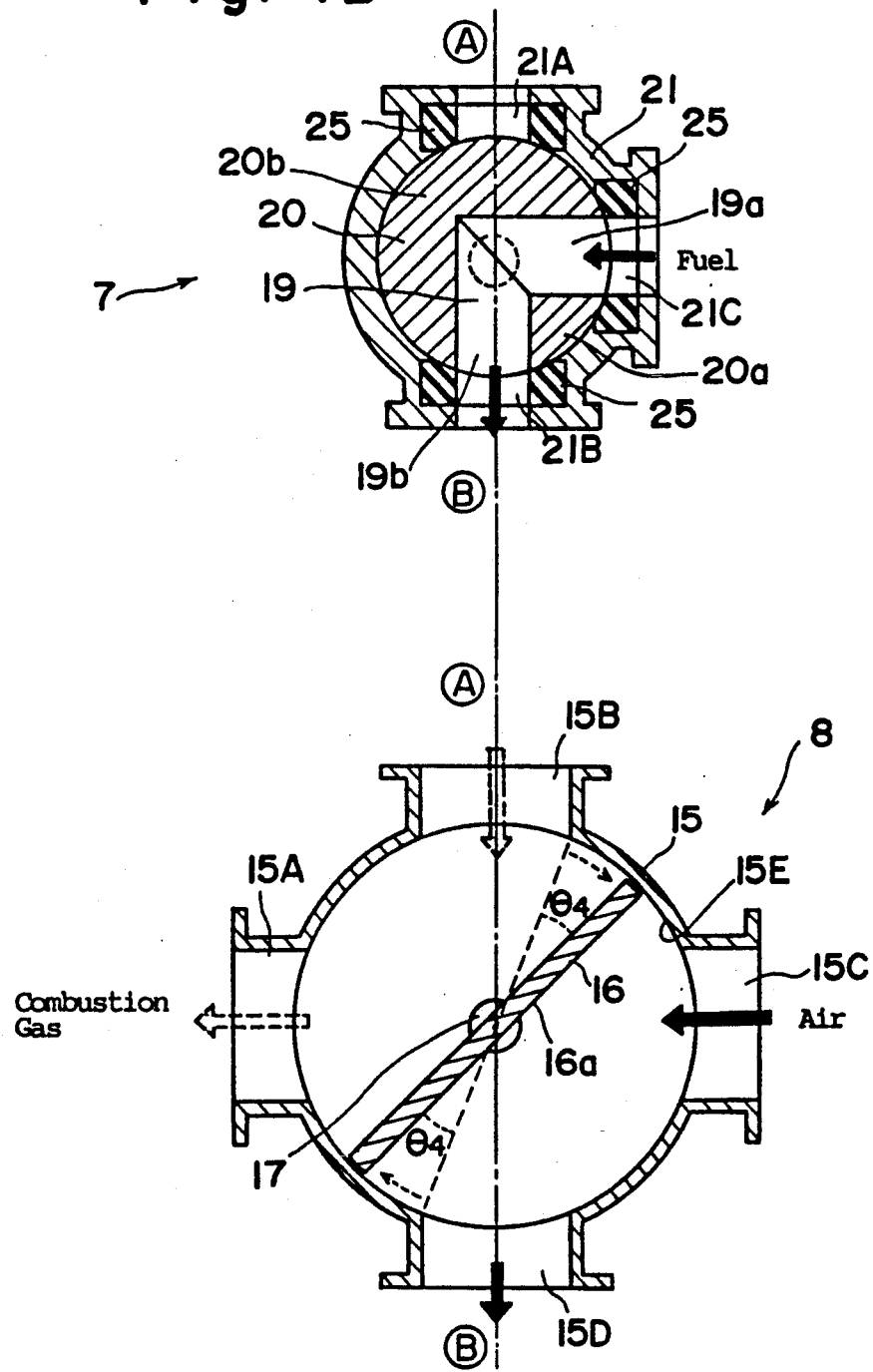
FIG. 4B is a schematic sectional view of a three-way valve and a four-way valve used in the burner device according to the present invention, which explanatorily shows the relative opening/closing state of both two valves for supplying a fuel and an air to a burner 3B.

The four-way valve 8, as best shown in FIG. 3 and FIGS. 4A and 4B, comprises a valve body 15 having four connecting ports 15A, 15B, 15C and 15D disposed circumferentially thereof in an equidistant relationship, a rotary inner valve element 16 rotatably mounted within the valve body 15 for the above-discussed flow change-over operation, and a shaft 17 rotatably journalled in the valve body 15, the shaft 17 supporting the rotary inner valve element 16. The rotary inner valve element 16 is formed by one plate-like material having a shape generally similar to the axially sectional shape of the valve body 15. As will be more specific later, the inner valve element 16 is so disposed as to partition the interior of valve body 15, defining two flow passages; one for communicating one set of two connecting ports with each other, and another for communicating another set of two connecting ports with each other, out of the foregoing four connecting ports 15A, 15B, 15C and 15D. Preferably, an appropriate clearance may be provided between the both ends of the rotary inner valve element 16 and the inner surface 15E of valve body 15, or a suitable sealing material may be provided therebetween to avoid a leakage of combustion air. As shown, the rotary inner valve element 16 is rotatable by 90 degrees to selectively supply the combustion air from the system 9 to one of the two ports 15B and 15D through one port 15C. Accordingly, the combustion air supply system 9 may be placed by the valve element 16 in a flow communication with one of the two ducts 30a and 30b respectively of burners 3A and 3B, whereby the combustion air may be selectively supplied into one of the two burners 3A and 3B which is to be operated for combustion. Simultaneous with such 90-degree rotation of valve element 16, the combustion gas, which is generated and sent from that operated burner (3A or 3B), is caused to flow though the non-operated burner (3A or 3B) and introduced via the duct (30a or 30b) towards the port 15A of valve body 15 connected to an exhaust system 10. Then, the gas is discharged by the fan 12 from the exhaust system 10 so as to be exhausted outwardly. The four-way valve 8 per se is of a known type and should not be limited thereto. As can be seen from FIGS. 4A and 4B, the shaft 17 penetrates centrally of and through the valve body 15, forming thus a center of rotation about which the rotary inner valve element 16 is rotated, and further the shaft 17 is at one end thereof connected to a shaft 22 of the three-way valve 7 and at another and thereof connected to a shaft 24 (or drive shaft) of an actuator 23 (see FIG. 5).

As shown in FIGS. 4A and 4B, the three-way valve 7 is a rotary three-way valve comprising a rotary inner valve element 20 having an L-shaped communicator port 19 formed therein and a valve body 21 having four connecting ports 21A, 21B and 21C disposed circumferentially thereof at a 90-degree equidistant interval. The rotary inner valve element 20 is rotatably mounted within the valve body 21, such that the outer surface of the former is in a slidable contact with the inner surface of the latter. This inner valve element 20 is supported by the shaft 22 which penetrates centrally of and through the valve body 21. The shaft 22 is rotatably journalled therein, thus forming a center of rotation for the valve element 20. The valve element 20 is to be rotated by the rotation of the shaft 22. A sealing material 25, such as a Teflon sheet material, is fitted in each of the three ports 21A, 21D and 21C, as shown in FIG. 4A. In the illustrated embodiment, the L-shaped communicator port 19 is composed of a first port portion 19a and a second port portion 19b. The first and second port portions 19a, 19b meet at right angles to each other on the center of the rotary inner valve element 20 (i.e. at 22), and extend therefrom in the outward direction, terminating in two communicating openings upon the peripheral surface of rotary inner valve element 20. With this structure, the three-way valve 7 is operable to cause rotation of the inner valve element 20 in the valve body 21, so as to bring the L-shaped communicator port 19, or strictly stated its first and second port portions 19a and 19b, in a mating correspondence with two of the foregoing three 90-degree equidistant ports 21A, 21B and 21C. Namely, as understandable from FIGS. 4A and 4B, with the rotation of inner valve element 20, it is possible to displace the first port portion 19a from the port 21A to the port 21C, while simultaneously displacing the second port portion 19b from the port 21C to the port 21B, to thereby establish a flow communication between the two ports 21C and 21B (see FIG. 4B). Referring now to FIG. 3, the port 21C of the three-way valve 7 is connected to the fuel supply system 13, and other remaining two ports 21A and 21B thereof are respectively connected to the two fuel supply passages 13a and 13b. Hence, operating the three-way valve 7 permits the L-shaped communicator port 19 to be connectable with either of the two fuel supply passages 13a, 13b so that a fuel may be selectively supplied to one of the two burners 3A, 3B. It is therefore possible to communicate the fuel supply system 13 with one of the burner guns 4, 4' through the three-way valve 7. It is noted that the three-way valve 7 is not limited to the illustrated one, but be of any type currently available insofar as it includes a communicator port corresponding to the L-shaped port 19 and is capable of selectively connecting the fuel supply system 13 with one of the fuel supply passages 13a, 13b in a interlocking relation with the four-way valve 8, the details of which will be described later.

Figure 6:
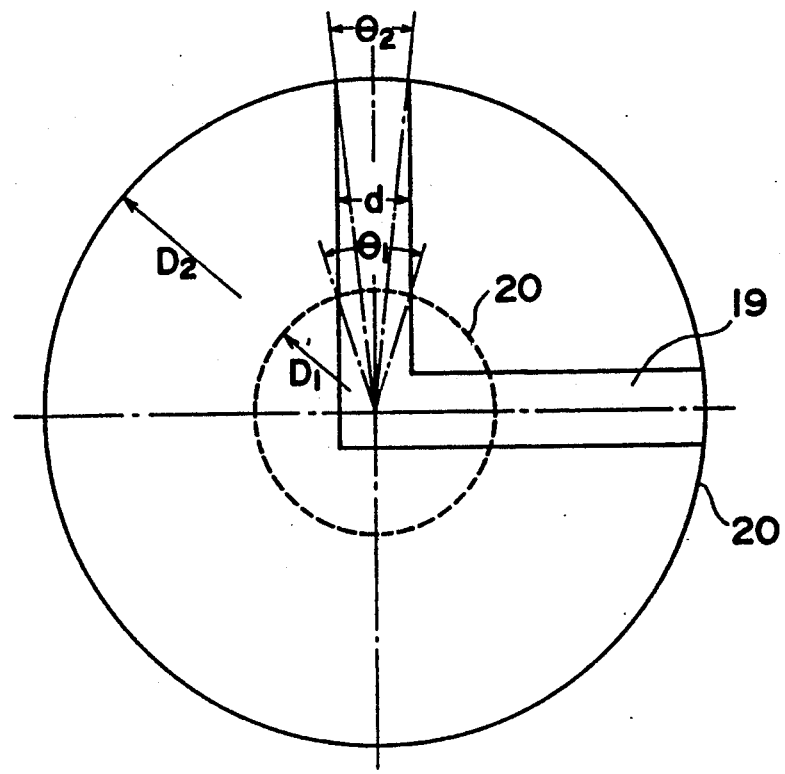
FIG. 6 is a schematic diagram which explanatorily shows a relation between a rotary inner valve element of the three-way valve and an L-shaped communicator port formed therein.

Now, reference is made to FIG. 6. In accordance with the present invention, it may be possible to attain a desired cross-sectional flow passage area of the above-mentioned L-shaped communicator port 19 of three-way valve 7 and further to make small the diameter d of the same port 19 relative to the dimensions of rotary inner valve element 20. In other words, the three-way valve 7 may be so designed as to increase the diameter of the circular cross-section of inner valve element 20 far greater than the diameter d of the L-shaped port 19, whereupon the L-shaped port's diameter d is made extremely small relative to the diameter of inner valve element 20, and therefore the communicating opening of the L-shaped port 19 may be rotated in a small angle of rotation with respect to the center at 22, relative to the increased circumference of inner valve element 20. As indicated in FIG. 6, assuming that the circular cross-section diameter of the element 20 is set to be small as "$D_1$" relative to the normal diameter d of L-shaped port 19, it follows that a relatively large angle of rotation "$\theta_1$" is obtained, which determines a relatively long time for the three-way valve 7 to complete its fuel flow change-over operation. Conversely, assuming that the diameter of same element 20 is set to be large as "$D_2$" relative to the L-shaped port's diameter d, a relatively small angle of rotation "$\theta_2$" is obtained, determining thus a relatively short time for the valve 7 to complete such change-over operation. This also results in detemining a time for closing the L-shaped port 19 with respect to two of the foregoing three connecting ports 21A, 21B and 21C, which will be set forth later.

Accordingly, it is possible to attempt to reduce the angle of rotation of the L-shaped port 19 for closing the three connecting ports 21A, 21B and 21C, while maintaining an optimal diameter of the L-shaped port 19 which avoids an increased loss of flow pressure of fuel passing through the L-shaped port 19. Namely, this permits for not only eliminating the pressure loss of fuel in the L-shaped port 19 which is easy to increase, but also keeping longer the closed state of L-shaped port 19 with respect to the three ports 21A, 21B and 21C. This realizes the increase of a delay time for delaying the supply of fuel to the burner 3A or 3B. In this respect, an electro-magnetic valve 14 is disposed in the fuel supply system 3, which is adapted for blocking the supply of fuel every time when one of the burners 3A, 3B is stopped for its combustion operation.

As shown, a rotary actuator 23 is provided as a preferred example of drive means for causing an interlocking or synchronized motion of the above-mentioned four-way and three-way valves 8, 7. The rotary actuator 23 is of the so-called rotary torque actuator type which may be powered by a flow pressure, such as pneumatic or hydraulic pressure, or an electric energy, and reciprocate a rotational motion of its output shaft 24 within 360 degrees to reverse a certain rotational drive by a given angle within such limited 360 degrees. Although not clearly shown, this rotary actuator 23 may be so controlled as to rotate its rotor by 90 degrees, in response to an air pressure being applied to its ports, while reversely rotating the rotor by 90 degrees.

Figure 5:
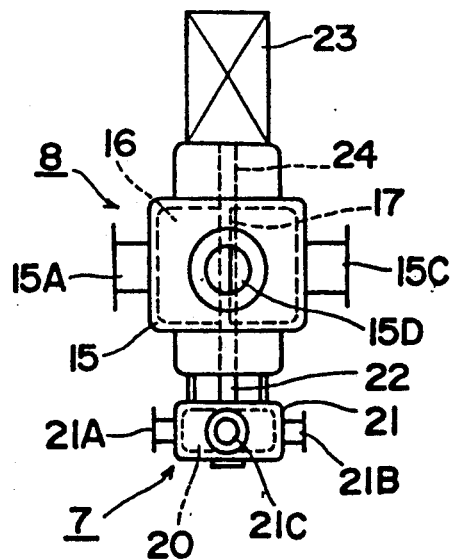
FIG. 5 is a schematic view showing a principal part of flow passage change-over mechanism in the present invention.

As best shown in FIG. 5, all those four-way valve 8, three-way valve 7 and rotary actuator 23 are disposed coaxially and connected together via their respective shafts 17, 22 and 24. The shafts 17 and 22, which pass along the respective central axes of the four-way valve's inner valve element 16 and three-way valve's one 20, are fixed coaxially to the output shaft 24 of actuator 23, so that both former shafts 17, 22 are rotated by the actuator 23 in unison. Further, it is important to note that both rotary inner valve elements 16, 20 respectively of those two valves 8, 7 have the same angle of rotation by which to complete their respective flow change-over operations, and therefore the two elements 16, 20 should be so connected together that when one of the associated valves 8, 7 completes its change-over operation, another of them also completes its change-over operation at the same time. Thus, in this embodiment, both four-way and three-way valves 8, 7 are operated simultaneously by the actuator 23 to rotate their respective rotary inner valve elements 16, 20 by 90 degrees in the same direction. Consequently, is is to be appreciated that the operation of rotary actuator 23 may, for example, cause simultaneous rotation of both four-way and three-way valves 8, 7 in one direction, by 90 degrees, to thereby simultaneously change both flow passages of fuel and air as shown in FIG. 4A to the ones shown in FIG. 4B; and thereafter reverse such operation to change over the flow passages from FIG. 4B to FIG. 4A, under the 90-degree reversing control.

The specific embodiments of both four-way and three-way valves 8, 7 are not limited to the above-described ones, but may adopt other various constructions and mechanisms, insofar as they satisfy the interlocking relation between the two valves 8, 7 to be explained below, and the same goes for the rotary actuator 28, which may be replaced by other suitable drive means for causing the flow passage change-over operations of those valves.

With the burner device RB constructed as above, let it be assumed that the combustion air and fuel are supplied to one burner 3A for combustion operation, while leaving another burner 3B inoperative and allowing the combustion gas from the combustion air supply system to be exhausted through such non-operated burner 3B. In this instance, the simultaneous drive of both three-way and four-way valves 7, 8 is produced by a common drive source, namely, the rotary actuator 23, which results in connecting or communicating the air supply system 9 and fuel supply system 13 with the first burner 3A, while simultaneously placing the second burner 3B in an inoperative state and communicating the combustion gas exhaust system 10 therewith. At this point, while being rotated at a same angle, the two associated inner valve elements 16, 20 cause a difference in timing for starting their respective flow change-over operations in relation to the ports of corresponding valve bodies (i.e. for the four-way valve 8, two of its four ports, and for the three-way valve 7, two of its three ports), due to their structural differences. In this regard, referring to FIGS. 4A, 4B and 7A, a specific explanation will be made about a timing of flow change-over operations of the three-way valve 7. When the rotary inner valve element 20 of three-way valve 7 is rotated clock-wise about the axis of shaft 22 by drive of the actuator 23 from the position in FIG. 4A to the one in FIG. 4B, the first and second port portions 19a, 19b of L-shaped port 19 formed in the valve element 20 are displaced in a direction to decrease their respective opening degrees with respect to the mating ports 21A and 21C of valve body (with which the port portions 19a, 19b has been in a flow communication, respectively, as in FIG. 4A). Thus, as indicated by the graph in FIG. 7A, the relative opening degrees between the first port portion 19a and port 21A, and the relative opening degrees between the second port portion and port 21B are decreased to terminate the flow communications among them, in accordance as the rotational angle $\theta$ of inner valve element 20 varies toward 90 degrees. Then, at somewhere between 30 and 40 degrees, both two ports 21A and 21B are closed, and they will be kept closed until the rotational angle reaches a point exceeding 50 degrees. This closed state is what may be described as "an inoperative angle area" corresponding to the portion designated by 32 in FIG. 7A. For, when the inner valve element 20 is rotated to change its rotational angle to such inoperative angle area, it will be seen in FIGS. 4A and 4B that all the ports 21A, 21C and 21B of three-way valve body are completely closed by the peripheral surfaces of inner valve element 20 which are defined by the L-shaped port 19 at the portions 20a and 20b, whereupon the three-way valve 7 is placed in the inoperative state. It is noted here that the closing time of those three ports 21A, 21C and 21B may be determined by a length of arc defined on the peripheral surface of the valve element portion 20a, and therefore, the inoperative angle area 32 can be set by such length of arc at 20a. This is based on the technical reason that the inner valve element 20 per se is subject to the above-stated 90-degree reversing control so as to rotate its L-shaped port 19 accordingly to change over the flow of fuel supplied from the main port 21C (which is connected with the fuel supply system 13) to one of other remaining ports 21A and 21B, which means that the peripheral surface portion at 20a is rotated clockwise and counterclockwise by 90 degrees in relation to the port 21C (see FIGS. 4A and 4B).

With further rotation of the inner valve element 20, when its rotational angle $\theta$ exceeds the foregoing inoperative angle area, the two ports 21C and 21B increases their opening degrees as the first and second port portions 19a, 19b of L-shaped port 19 begins to be communicated with those two ports 21C and 21B, respectively. This is shown by the inclined line at the flow passage B in FIG. 7A. Finally, when the valve element 20 has been rotated to 90 degrees, the flow passage of fuel is completely changed over to the port 21B.

On the other hand, during the above-described flow change-over operation of three-way valve 7, of course the four-way valve 8 are also operated for change-over of the flow of combustion air. However, the four-way valve 8 has its rotary inner valve element 16 different structurally from that 20 of the three-way valve 7. Namely, the former valve element 16 is of such plate-like structure suited for changing the flowing directions of both combustion air and gas through the four ports 15A, 15B, 15C and 15D, and for this particular combustion air supply purpose, the structure works for changing over the flow of combustion to one of the ports 15B and 15D in relation to the main port 15C, in view of the fact that the ports 15B, 15D are respectively connected to the burners 3B, 3A whereas the port 15C is connected to the combustion air supply system. Accordingly, as understandable from FIGS. 4A and 4B, if such inner valve element 16 is rotated clock-wise about the shaft 17 by 90 degrees, the right-side surface 16a of same vale element 16 decreases the opening rate of the port 15B for admission of the combustion air, while increasing, by contrast, the opening degree of the port 15D for the same air admission purpose. In that way, the flow passage of combustion air is switched from the port 15B to the port 15D (see FIG. 4B), thereby altering the air supply from the burner 3A to the burner 3B.

According to the embodiment shown in FIGS. 4A and 4B, the inner valve element 16 of four-way valve 8 is so designed to assume approx. 45-degree inclination, in the cross-section, in both initial and final positions; in other words, irrespective of being located at the initial position as shown in FIG. 4A and at the final position as shown in FIG. 4B, the valve element 16 is inclined at an angle generally bisecting the 90-degree interval of the four ports 15A to 15D. For this reason, looking at the initial position in FIG. 4A, the valve element 16 lies a certain distance from both opposite ports 15B, 15D by an angle $\theta_3$, which provides an inoperative angle area where the valve element 16 remains inoperative by the length of arc whose central angle is equal to such angle $\theta_3$. Namely, if the four-way valve 8 is operated, its inner valve element 16 is initially rotated in the angle $\theta_3$, during which, such element 16 is kept inactive for the foregoing change-over of combustion air. This inoperative angle area can be expressed by the horizontal line section $30_{-1}$ in the graph of FIG. 7B, and during this stage, the port 15B is opened fully to permit supply of combustion air to the burner 3A. At this point, it is to be understood that the flow amount of the combustion air from the port 15C to the one 15B is 100% and so is the flow amount of the combustion gas from the port 15D to the one 15A (see both FIGS. 3 and 4A). That is to say, the combustion air and gas are distributed to those two flow passages at the rate of 100% by the inner valve element 16 at this point of time. Stated otherwise, the distribution ratio between the combustion air and gas is 100%, as shown in FIG. 7B.

Thereafter, the valve element 16 rotates to decrease the opening rate of the port 15B for the air admission, while simultaneously increasing that of the port 15D. Then, at the point indicated by 31 in FIG. 7B, the valve element 16 lies generally upright as viewed from FIG. 4A to generally align with the central axes of both ports 15B, 15D. Under this condition, it is seen that the distribution ratio between the combustion air and gas is 50%, as shown in FIG. 7B, without all the ports 15A, 15B, 15C and 15D being closed. Then, as can be recognized by the point 31 in FIG. 7B, the inner valve element 16 continues to rotate clockwise, quickly leaving from the above stated upright position, without closing any of those four ports, thereby increasing the opening degree of the port 15D for admission of the combustion air thereinto and decreasing that of the port 15B at the same time. As a result, the flow passage of combustion air is changed and directed to the port 15D, as shown by the right-side inclined line in FIG. 7B which is labeled "flow passage Ⓑ". Also, simultaneously, the combustion gas is flowed from the port 15B to the common one 15A, as understandable from FIGS. 4A and 4B.

Even after this completion of flow passage change-over process, the inner valve element 16 is kept rotated from the fully opened port 15D by the length of arc whose central angle is $\theta_4$ towards the terminal point shown by the solid line in FIG. 4B where the valve element 16 accomplishes its 90-degree rotation. This provides a final inoperative angle area, as designated by $30_{-2}$ in FIG. 7B, similar to the aforementioned initial inoperative angle area $30_{-1}$.

With the above-discussed arrangement, it can be observed for instance that both combustion air and fuel supply systems 9, 13 may be brought in a flow communication with the burner 3A, while simultaneously not only disconnecting the flow of fuel from the opposite burner 3B, but also placing the same burner 3B in a flow communication with the combustion gas exhaust system 10, and that although this is executed by the synchronized rotation of the four-way and three-way valves 8, 7, there occurs a difference in timing for flow changeover operation between the two valves 8, 7: Namely, the four-way valve 8 presents the two inoperative angle areas $30_{-1}$, $30_{-2}$ where its opening degree does not vary and the point 30 where the distribution ratio is changed between the combustion air and gas, without closing any of the four ports 15A, 15B, 15C and 15D. In contrast thereto, the three-way valve 7, upon its operation, decreases the opening degree with regard to two of the three ports 21A, 21B and 21C, then resides temporarily inoperative in the inoperative angle area 32, with all those ports being completely closed, and thereafter executes the flow change-over operation of fuel. Consequently, such arrangement will stop the supply of fuel to the burner 3A before changing over the flow of combustion air from that burner 3A to other one 3B, and will start supplying the fuel to the latter burner 3B after lapse of a certain time subsequent to the flow of air having been changed over to the same 3B, as seen in the flow passages Ⓐ and Ⓑ in FIGS. 7A and 7B. A proper delay time can be set for delaying the supply of fuel to an operated one of the two burners 3A, 3B; that is, a proper lead time can be secured for causing prior supply of combustion air, earlier than the supply of fuel, to the operated burner 3A or 3B.

Figure 7A:
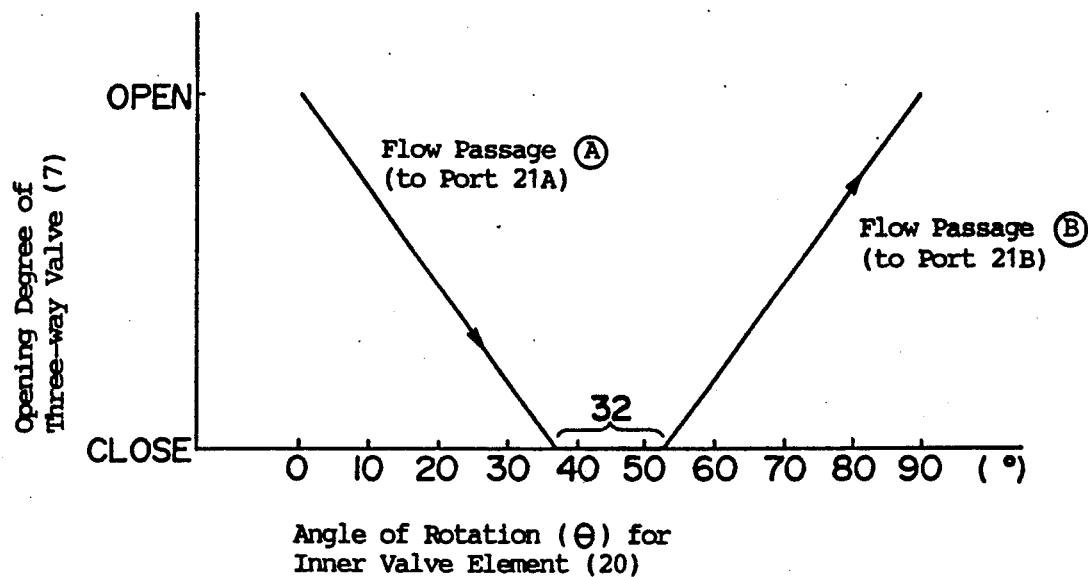
FIG. 7A is a graph showing an opening degree of the ports of the three-way valve in relation to the angle of rotation thereof.
Figure 7B:
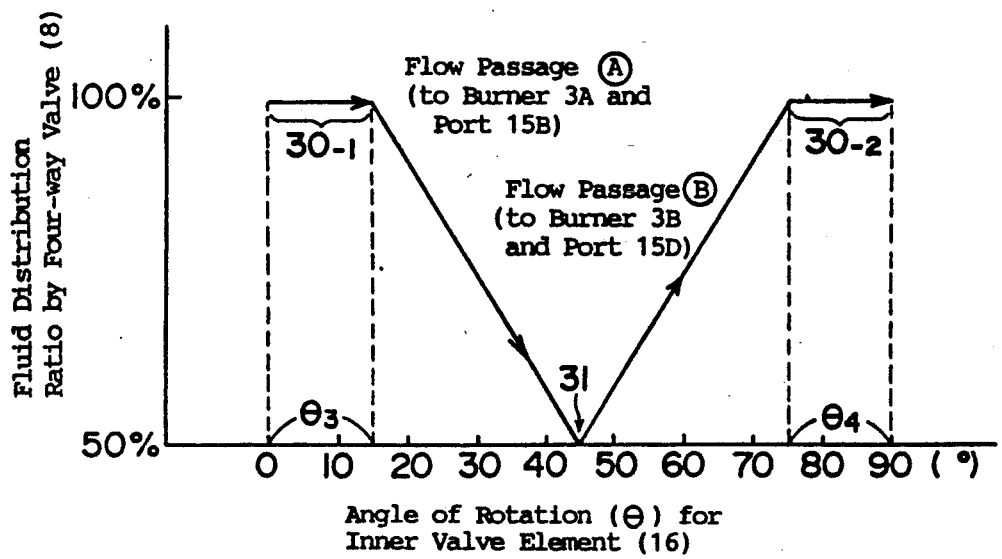
FIG. 7B is a graph showing a fluid distribution ratio of the ports of the four-way valve in relation to the angle of rotation thereof.

More specifically, a comparative view of FIGS. 7A and 7B indicates that, if the three-way and four-way valves 7, 8 are simultaneously rotated toward 90 degrees, the point of time when the three-way valve 7 starts changeover of fuel flow from the port 21A toward the one 21B is found at a point exceeding about 50 degrees of rotational angle taken by the associated inner valve element 20, at which time, the valve element 20 leaves from the inoperative angle area 32, whereas on the other hand, the point of time when the four-way valve 8 starts changeover of combustion air flow from the port 15B to the one 15D is found at a point exceeding the initial inoperative area $30_{-1}$, which is quite earlier than the fuel flow changeover of three-way valve 7. Further, the four-way valve 8, by reason of its inner valve element 16 being of thin-plate formation, starts to open the port 15D increasingly while closing the port 15B, from such initial inoperative area $30_{-1}$. Hence, with the inner valve element 16 rotated to reach a point of middle at 45 degrees (i.e. at the point 31 in FIG. 7B), it just appears as if the distribution ratio of the combustion air and gas to the two ports 15B, 15D became 50%, and strictly stated, all the air and gas are drawn towards the port 15A by the induced suction force of the fan 12, but the rotation of the inner valve element 16 is so quick that most of the air and gas are not flowed to any of the ports 15A, 15B, 15C and 15D, which can be disregarded, and then the flow passages of air and gas are respectively changed over to their corresponding ports 15B and 15D. At this moment, the three-way valve 7, by reason of its inner valve element 20 having the generally right-angle L-shaped port 19, still stays in the inoperative area 32 and completely closed. Accordingly, the timing chart given in FIG. 8 helps to explain this process in a more simple way. From this chart, it is seen that, at the beginning of changeover of air flow to the burner 3A, the supply of fuel to other burner 3B has, of course, been stopped and is not supplied to the former one 3A, but only the air is supplied to the burner 3A earlier than the fuel. Then, turning back to review of FIG. 7B, the inner valve element 16 of four-way valve 7 is rotated further from the point 31 to reach the final inoperative area $30_{-2}$ at about 75 degrees, whereupon the opening degree of the port 15D is 100% and also the distribution ratio of combustion air to the burner 3A becomes 100%, thereby completing the flow changeover of combustion air. The three-way valve 7, at this point, gives only about ⅔ as a rate of its opening degree, and is supposed to fully open when its inner valve element 20 reaches 90 degrees, causing a complete flow communication between the L-shaped port 19 and 21B. Otherwise stated, according to the timing chart in FIG. 8, after lapse of a delay time $t_1$ subsequent to the air flow having been changed over to the burner 3A, the fuel is suppled to the same burner 3A. Thus, the supply of fuel to the burner 3A is timed with such delay time $t_1$, after which, the combustion operation is altered from the burner 3B to the one 3A. It is appreciated that the prior invasion of combustion air into the burner 3A effectively facilitates the ignition of the fuel which is to be supplied later in a time set by the delay time $t_1$, with the result that a combustion can be started in the burner 3A smoothly with out any pause.

Figure 8:
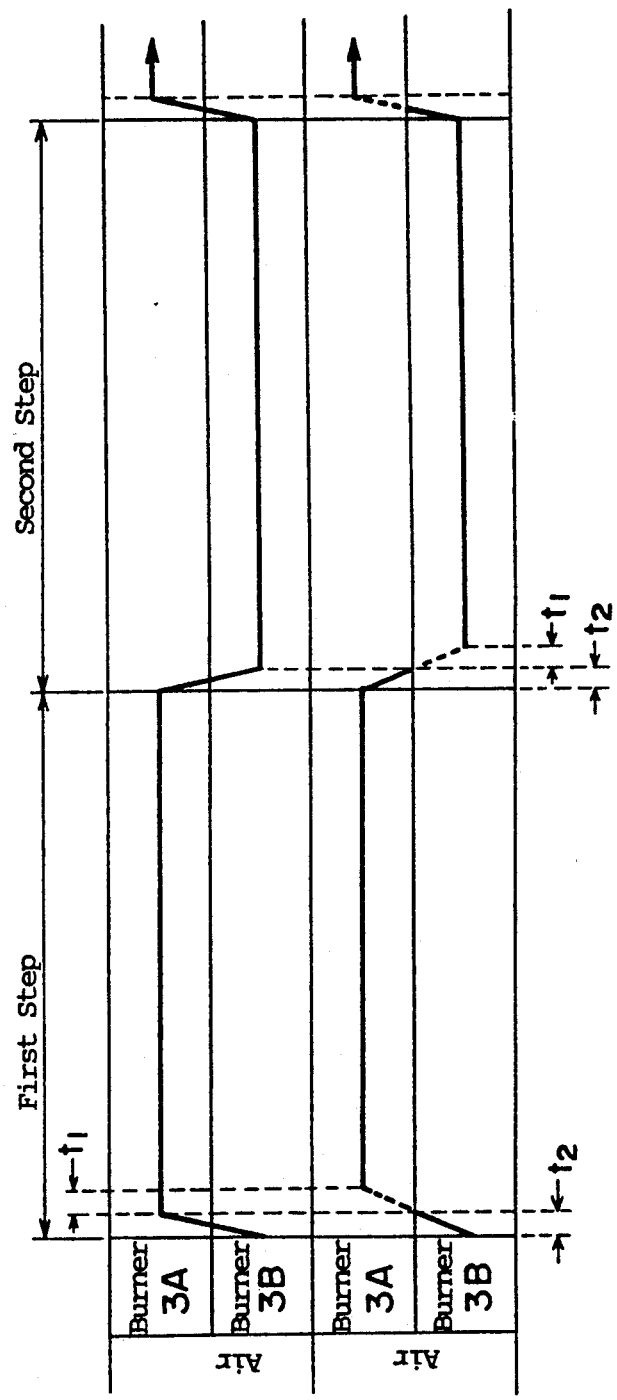
FIG. 8 is a timing chart showing a timing of fluid passage changeover between the two burners 3A, 3B.

The above-described interlocking operation of both three-way and four-way valves 7, 8 is repeated in the next second step where the combustion is altered again from the burner 3A to the one 3B, in which case, the actuator 23 is driven in a reverse direction to execute all the processes reversely, such that the rotary inner valve elements 20 and 16 respectively of the two valves 7 and 8 are caused to rotate reversely by 90 degrees. This second combustion step is generally shown in FIG. 8 at the time section "second step", from which it is observed that, after the flow passage of combustion air has been changed over to the burner 3B completely, the same delay time $t_1$ is provided, after which, the fuel is supplied to the same burner 3B for combustion therein.

It is noted that, during the alternate combustion operation between the two burners 3A, 3B, the supply of fuel to one of them at work for combustion will be stopped in advance before disconnecting the supply of combustion air thereto, and further, at a certain delay time after starting the supply of combustion air to the operated one of the burners 3A, 3B, the fuel will be supplied thereto.

From the descriptions above, the alternate combustion type burner according to the present invention is endowed with the following advantages:

(1) The two structurally different three-way and four-way valves 7, 8 are connected together coaxially for interlocking and synchronic operation to change over their respective fluid passages, so that the fuel may be supplied to an operated one of burners 3A, 3B at a delay time after supply of the combustion air thereto and further the supply of fuel may be stopped prior to the discontinuation of combustion air. A proper delay time and lead time can be set respectively for the supply of of fuel and the supply of combustion air.

(2) The rotary inner valve element 20 of the three-way valve 7 may be so designed that its L-shaped port 19 is made small in diameter relative to the cross-sectional diameter of inner valve element per se, by increasing the dimensions of the latter. This permits for retaining a required cross-sectional flow passage area of the L-shaped port 19 and avoiding an increased loss of pressure of fuel flowing through the same port 19. Also, to determine properly the dimensions or diameter of inner valve element 20 will lead to setting a proper delay time or lead time as stated previously.

(3) The interlocking relation between the three-way and four-way valves 7, 8 is also advantageous in requiring only one electro-magnetic valve 14, which is a contributor to a low-cost assemblage and far simplified structure of the burner device.

While having described the present invention above, it should be understood that the invention is not limited to the illustrated embodiments, but any other various modifications, replacements and additions may be applied thereto without departing from the scope and spirit of the appended claims for the invention. For example, the embodiments of the invention may be applied to an open flame burner or the like.

What is claimed is:

1. A burner device of regenerative and alternative combustion type including a pair of burners and a regenerative bed, wherein a combustion air is supplied through said regenerative bed to said burners and a combustion gas generated therefrom is exhausted through said regenerative bed, and wherein both said combustion air and a fuel are alternately supplied to either of said pair of burners, so that a combustion is performed in one of said burners, while not being performed in another of said burners, said regenerative heating burner device comprising:
   a combustion air supply system which is connected via said regenerative bed to said pair of burners and further connected to a combustion air supply source;
   a fuel supply system which is connected to said pair of burners and further to a fuel supply source;
   an exhaust system for exhausting said combustion gas generated from said one of said pair of burners;
   a four-way valve means which are connected to said combustion air supply system and said exhaust system and further to said pair of burners via said regenerative bed, said four-way valve means being so arranged as to selectively change over a flow passage of said combustion air sent from said combustion air supply source to one of said pair of burners, while simultaneously feeding said combustion gas to said exhaust system;
   a three-way valve means provided in said fuel supply system, said three-way valve means being so arranged as to selectively change over a flow passage of said fuel sent from said fuel supply source to one of said pair of burners, thereby supplying said fuel thereinto; and
   one drive means for causing an interlocking operation of said drive means for causing said two valve means to be actuated simultaneously, so as to effect their respective said selective flow passage changeover actions at the same time, whereby both said combustion air and fuel may be alternately supplied to either one of burners or another of burners while providing a lead time for the prior supply of said combustion air to the selected one of said burners and thus a delay time for delaying supply of said fuel thereto.

2. The burner device according to claim 1, wherein said four-way and three-way valve means have a same angle of rotation for completing their respective said selective flow passage changeover actions, and are operated in unison by said drive means, wherein said four-way valve means is provided with an initial inoperative area and a final inoperative area, whereas said three-way valve means is provided with one inoperative area, with such an arrangement that, during the operation, said four-way valve means is not involved for the flow passage changeover action of said combustion air and gas at an initial stage and a final stage, respectively, in said initial and final inoperative areas, and completes said changeover action between said two inoperative areas, whereas said three-way valve means is temporarily closed, during the operation, in said inoperative area thereof, and reopened for completing the selective fuel flow passage changeover action, and that said initial and final inoperative areas of said four-way valve means are defined respectively close to an initial point of said three-way valve means where it starts to be closed and a final point of the same where it starts to be reopened after leaving from said inoperative area, so that when said three-valve means is being placed in said inoperative area thereof, said four-way valve means begins to change over both flow passages of said combustion air and gas, thereby providing a lead time for prior supply of said combustion air to a selected one of said burner and thus a delay time for delaying supply of said fuel thereto.

3. The burner device according to claim 1, wherein said four-way and three-way valve means are connected coaxially together by said drive means.

4. The burner device according to claim 1, wherein said three-way valve means includes a rotary inner valve element provided rotatably therein, three connecting ports connected to said fuel supply system, and a communicator port penetrated through said rotary inner valve element, said communicator port being displaceable with rotation of said rotary inner valve element to cause said selective changeover of said fuel passage, an arrangement of said three-way valve means being such that a diameter of said rotary inner valve element is increased, while retaining a required cross-sectional flow passage area of said communicator port, to thereby permit reducing an angle of rotation of said rotary inner valve element for closing said fuel flow passage being opened by said communicator port for communication with one of said burners, and avoiding an increased loss of pressure in a portion of said fuel flow passage between said communicator port and said fuel flow system.

5. The burner device according to claim 1, wherein said four-way valve means comprises a valve body, a first port, a second port, a third port and a fourth port disposed peripherally of said valve body at a 90-degree interval, and a rotary inner valve element of a plate form, said rotary inner valve element being rotatably provided within said valve body in a state being inclined at about 45 degrees, generally bisecting said 90-degree interval of said four ports, wherein said first port is connected with said combustion air supply source, said second port is connected with said exhaust system, said third port is connected with one of said pair of burners, said fourth port is connected with another of said pair of burners, therein operation of said drive means causes rotation of said plate-like rotary inner valve element to selectively change over said combustion air flow passage to one of said pair of burners in relation to the first port, so that said combustion air may be supplied from said first port to the selected one of said pair of burners through one of said third and fourth ports, while simultaneously said combustion gas may be exhausted from another of said pair of burners through said second port, wherein said three-way valve means comprises a valve body, a first port, a second port and third port disposed peripherally thereof, and a rotary inner valve element rotatably provided in said valve body, such that said first port is connected with said fuel supply source, said second port is connected with one of said pair of burner, and said third port is connected with another of said pair of burner, wherein said rotary inner valve element has a communicator port penetrated therein, said communicator port being normally disposed to place said first port in a flow communication with one of said second and third ports, and wherein said inner rotary inner valve elements respectively of said four-way and three-way valve means has a same angle of rotation for completing their respective flow passage changeover actions, whereby, in operation, said drive means causes simultaneous rotation of said rotary inner valve elements of both four-way and three-way valve means, which results in said four-way valve means starting and completing the changeover of combustion air and gas flow passage to the selected one of said pair of burner via one of said third and four ports, earlier than the fuel flow passage change-over by said three-way valve means, thereby providing a lead time for the prior supply of said combustion air to the selected one of said burners and thus a delay time for delaying supply of said fuel thereto.

6. The burner according to claim 5, wherein said delay time may be determined by a distance between two communicator ports of said rotary inner valve element of said three-way valve means.

7. The burner according to claim 5, wherein said communicator port associated with said three-way valve means is of a generally L-shaped configuration.

* * * * *